United States Patent
Moore

[15] 3,686,336
[45] Aug. 22, 1972

[54] PERFLUORODICYCLOPENTADIENE

[72] Inventor: Earl Phillip Moore, Wilmington, Del.

[73] Assignee: E. I. du Pont de Nemours and Company, Wilmington, Del.

[22] Filed: Nov. 24, 1964

[21] Appl. No.: 413,621

[52] U.S. Cl.............................................260/648 F
[51] Int. Cl..............................................C07c 23/38
[58] Field of Search........................260/648 F, 648 C

[56] References Cited

UNITED STATES PATENTS 2,459,780   1/1949   McBee....................260/648 F
2,702,305   2/1955   Gilbert....................260/648 C

OTHER PUBLICATIONS

Banks et al, J. Chem. Soc. 1963 5581– 5583

*Primary Examiner*—Daniel D. Horwitz
*Attorney*—Francis A. Paintin

[57] ABSTRACT

This invention relates to a new chemical compound, perfluorodicyclopentadiene ($C_{10}F_{12}$) also called the dimer of perfluorocyclopentadiene ($C_5F_6$). The compound perfluorodicyclopentadiene has a molecular weight of 348, boiling point 119°–120° C. at atmospheric pressure, a density at 45° C. of 1.75, refractive index $nD^{45}=1.3387$, a melting point of about 43° C.; the compound may be represented by the structural formula:

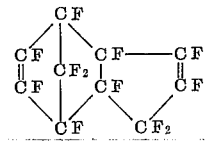

1 Claim, No Drawings

PERFLUORODICYCLOPENTADIENE

This invention relates to a new chemical compound, perfluorodicyclopentadiene ($C_{10}F_{12}$) also called the dimer of perfluorocyclopentadiene ($C_5F_6$). The compound perfluorodicyclopentadiene has a molecular weight of 348, boiling point 119°–120° C. at atmospheric pressure, a density at 45° C. of 1.75, refractive index $n^{45}_D = 1.3387$, a melting point of about 43° C.; the compound may be represented by the structural formula:

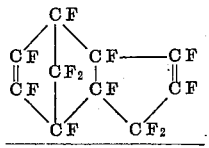

The preparation of the compound is described in the following example wherein parts and percentages are by weight unless otherwise specified:

EXAMPLE

A 1-liter, round-bottom three-neck flask is equipped with an addition funnel, a thermometer, a stirrer and a Vigreaux column topped by a take-off arm and a cold water condenser, both of which lead to traps cooled by Dry Ice. To the flask is added 100 gm. of acid-washed zinc dust, and 0.2 gm. of fused zinc chloride suspended in 200 ml. of sodium-dried dioxane. The mixture is heated to reflux. To the flask is then gradually introduced with rapid stirring 230 gm. (0.77 mole) of trichloroheptafluorocyclopentane in 100 ml. of sodium-dried dioxane. A smooth exothermic reaction begins about ½ hour after a 10 ml. portion is added. The remainder is added at a rate to maintain the reaction under reflux. After all the trichloroheptafluorocyclopentane solution is added, the flask and contents are maintained under reflux for 24 hours. The residue shows a positive reaction for fluoride and chloride ions. There is no liquid carried over into the traps. The flask is heated and distillate removed until a head temperature of 100° C. is reached. The distillate is then distilled through a 30-inch spinning band column, the head of which is cooled with circulating methanol, which is cooled by a Dry Ice/acetone mixture.

The following fractions are collected:

| Fraction | Boiling Point °C. |
|---|---|
| 1 | 29 |
| 2 | 30 |
| 3 | 56.5 |
| 4 | 58.0 |
| 5 | 100 |
| Residue | yellow oil which fumes in air with apparent decomposition when washed with ice water to remove dioxane |

The fraction recovered at 30° C. is $C_5F_6$, hexafluorocyclopentadiene (hereinafter referred to as the "-monomer"). Gas chromatographic analysis shows no other materials are present. The monomer is stored in a Dewar flask cooled by Dry Ice.

The monomer is allowed to warm to room temperature by permitting the Dry Ice to evaporate during a 48-hour period. A semi-solid is formed. When gradually heated, the product distills at 119°–120° C. The product is identified as perfluorodicyclopentadiene ($C_{10}F_{12}$) (the dimer of hexafluorocyclopentadiene) by the following analyses:

A. Elemental analysis for
   C — 34.02 percent; calculated 34.47
   F — 65.51 percent; calculated 65.52
   H — 0.29 percent; calculated 0.00

B. Molecular weight — 337,340 found; 348 calculated.

C. Infrared spectral analysis shows an intense band at the 1,770 cm$^{-1}$ wavelength, expected for a fluorinated —C=C— stretching vibration, also indicative of a five-membered ring. A weaker band at the 1,748 cm$^{-1}$ wavelength is indicative of a six-membered ring. Bands observed around the 950–930 wave numbers indicate skeletal vibrations expected in a dual-ring system.

D. Fluorine nuclear magnetic resonance spectra reveal 4 resonances in the region 110 to 160 ppm (parts per million), indicative of saturated CF groups, and 5 resonances in the region 25 to 50 ppm, indicative of unsaturated CF groups. The spectra were run at 40 megacycles per second and the chemical shifts in ppm were all at high field relative to the reference, external trifluoroacetic acid.

The compound perfluorodicyclopentadiene is useful as a monomer in the preparation of homopolymers and copolymers with various other ethylenically unsaturated monomers copolymerizable therewith. These polymers are useful as plastics in the preparation of molded articles and as elastomeric materials. Utility of the compound perfluorodicyclopentadiene is also illustrated as follows:

A 5 percent solution of low molecular weight tetrafluoroethylene polymer in perfluorodicyclopentadiene is heated to reflux and then a strip of paper is partially immersed in the solution. The paper is withdrawn after about 30 seconds and then allowed to air-dry until the perfluorodicyclopentadiene has evaporated. A test with water indicates that the portion of the strip immersed in the solution is waterproof.

As many widely different embodiments of this invention may be made without departing from the spirit and scope thereof, it is to be understood that this invention is not limited to the specific embodiments thereof except as defined in the appended claim, and all changes which come within the meaning and range of equivalence are intended to be embraced therein.

What is claimed is:

1. Perfluorodicyclopentadiene.

* * * * *